Patented Apr. 6, 1943

2,316,084

UNITED STATES PATENT OFFICE 2,316,084

LUBRICANT

Clarence M. Loane, Hammond, Ind., James W. Gaynor, Chicago, Ill., and Lawson W. Mixon, Hammond, Ind., assignors to Standard Oil Company, Chicago, Ill., a corporation of Indiana No Drawing. Application March 24, 1941, Serial No. 384,943

19 Claims. (Cl. 252—48)

The present invention relates to improvement in additives for mineral oils and in particular to an improved phosphorus-containing additive for mineral oils and to the method of preparing the same.

In copending applications, Serial No. 384,936, filed March 24, 1941, and Serial No. 348,938, filed March 24, 1941, there are respectively described as additives to mineral oils phosphorus sulfide-olefin polymer reaction products and neutralized phosphorus sulfide-olefin polymer reaction products which are effective in inhibiting the deterioration of such oils and the attendant formation of sludge, carbon, and varnish-like deposits, and the method of preparing the additives.

While the phosphorus sulfide-olefin polymer reaction products as described in the aforesaid copending applications are very effective in inhibiting the deterioration of mineral oils and in preventing the formation of sludge, carbon and/or varnish-like deposits in internal combustion engines during use, they possess a characteristic odor which may be considered objectionable by users of oils containing such additives.

It is an object of the present invention to provide a method of improving the odor of phosphorus sulfide-olefin polymer reaction products without decreasing the effectiveness of the reaction products. It is a further object of the invention to provide a substantially odorless phosphorus sulfide-olefin polymer reaction product which is effective in inhibiting the deterioration of mineral oils and which is effective in preventing the formation of sludge, carbon and/or varnish-like deposits in internal combustion engines during use.

We have discovered that the foregoing objects can be attained by reacting the phosphorus sulfide-olefin polymer reaction product or the neutralized reaction product with an agent having an active hydrogen atom at elevated temperatures, for example, from about 100° F. to about 600° F., and preferably from about 300° F. to about 400° F., either undiluted or in solution in oil or other suitable solvents. Illustrative of the type of agents having an active hydrogen atom at elevated temperatures which are well suited for the hereindescribed purpose are steam, alcohols, ammonia, and amines.

The phosphorus sulfide used in the preparation of the additive can be any phosphorus sulfide, such as, for example, $P_2S_3$, $P_2S_5$, $P_4S_7$, $P_4S_3$, etc., and preferably, $P_2S_5$.

The olefin polymers employed as starting materials in the preparation of the reaction product are polymers of olefinic hydrocarbons, particularly polymers of low molecular weight mono-olefinic hydrocarbons.

The mono-olefin polymer to be treated is suitably the polymer resulting from the polymerization of low molecular weight iso-mono-olefins such as isobutylene and isoamylene and/or the co-polymers obtained by the polymerization of hydrocarbon mixtures containing low molecular weight iso-mono-olefins and normal mono-olefins such as those of less than six carbon atoms, and preferably those of four carbon atoms. The polymer can be obtained by the polymerization of these mono-olefins or mixed mono-olefins in the presence of catalysts such as sulfuric acid, phosphoric acid, boron fluoride, aluminum chloride or other similar halide catalyst of the Friedel-Crafts type.

The polymers employed are preferably mono-olefin polymers, in which the molecular weight ranges from about 150 to about 50,000, or more, and preferably from about 500 to about 10,000. These polymers can be obtained, for example, by the polymerization in the liquid phase of iso-olefins such as isobutylene or hydrocarbon mixtures containing the same at a temperature of from about −80° F. to about 100° F., in the presence of a catalyst such as boron fluoride. In the preparation of these polymers we may employ, for example, liquid isobutylene or a hydrocarbon mixture containing isobutylene, butanes, and butylene, recovered from petroleum gases, especially those gases produced in the cracking of petroleum oils in the manufacture of gasoline. This light fraction may contain from about 10% to about 25% isobutylene, the remainder being principally butanes and normal butylene.

The preparation of low molecular weight polymers having molecular weights varying from about 150 to about 2,000, from the butane-butylene-isobutylene fraction can be carried out as follows: The hydrocarbon mixture containing 10% to 25% isobutylene is maintained under pressure sufficient to keep it in the liquid phase and cooled to a temperature of, for example, from about 0° F. to about 100° F., and preferably from about 0° F. to about 32° F. and from about 0.1% to about 2% boron fluoride, based upon the isobutylene content of the material treated, is added with vigorous agitation. Excessive rise in the temperature due to the heat of reaction can be avoided by efficient cooling. After the polymerization of the isobutylene together with a relatively minor amount of the normal olefins present, the reaction mass is neutralized and washed free of acidic substances arising from the catalyst, the oily layer is separated, and the polymer subsequently separated from the unreacted hydrocarbons by distillation. The polymer mixture so obtained, depending upon the temperature of reaction, varies in consistency from a light liquid to a viscous oily material and contains polymers having molecular weights ranging from about 100 to 2,000. The polymers so obtained may be fractionated under reduced pressure into fractions of increasing molecular weights, for example, a distillate of about 150 seconds to about 200 seconds Saybolt Universal viscosity at 100° F., or other desired fractions, and the fractions, or any one of them, used as a starting material. The bottoms resulting from the distillation of the polymer are well suited for the purpose of the present invention. Bottoms having Saybolt Universal viscosities at 210° F. of from about 50 seconds to about 10,000 seconds, and preferably above 80 seconds, can be employed.

The phosphorus sulfide-olefin polymer reaction product can be obtained by reacting a phosphorus sulfide, for example, $P_2S_5$, with any of the above described polymers at temperatures of from about 200° F. to about 500° F. and preferably from about 300° F. to about 400° F., preferably in a non-oxidizing atmosphere, such as an atmosphere of nitrogen. From about 1% to about 50%, and preferably from about 5% to about 25%, of the phosphorus sulfide may be used. If excess phosphorus sulfide is used the reaction product may be freed of the excess phosphorus sulfide by filtering or by diluting with a solvent such as hexane, filtering and subsequently removing the diluent.

The phosphorus sulfide-olefine polymer reaction product as above obtained, normally shows a titratable acidity which is neutralized when the reaction product is treated with a basic reagent. The phosphorus sulfide-olefin polymer reaction product when neutralized with a basic reagent having a metal constituent is characterized by the presence or retention of the metal constituent of the reagent. Other metal constituents, such as heavy metal constituent, can be introduced into the neutralization product by reacting the latter with a salt of the desired heavy metal.

The term "neutralized phosphorus sulfide-olefin polymer reaction product" as used herein means a phosphorus sulfide-olefin polymer reaction product having at least about 1% of its titratable acidity reduced by the reaction with a basic reagent, and includes the neutralized phosphorus sulfide-olefin polymer reaction products containing a metal constituent, resulting from said neutralization or resulting from the reaction of a heavy metal salt with the phosphorus sulfide-olefin polymer reaction product treated with a basic reagent. The phosphorus sulfide-olefin polymer reaction product may be neutralized by treating the reaction product with a suitable basic compound such as an hydroxide, a carbonate, or an oxide of an alkaline earth metal or an alkali metal, preferably calcium oxide, potassium hydroxide, or sodium hydroxide. Other basic reagents may be used such as, for example, ammonia or an alkyl or aryl substituted ammonia, such as amines. The neutralization may be carried out in a non-oxidizing atmosphere. As aforesaid when the phosphorus sulfide-olefin polymer reaction product is neutralized with a basic compound having a metal constituent the neutralized reaction product is characterized by the retention of the metal constituent of the basic reagent. Neutralized reaction products containing a heavy metal constituent such as, for example, tin, titanium, aluminum, chromium, cobalt, iron and the like, may be obtained by reacting a salt of the desired heavy metal with the phosphorus sulfide-olefin polymer reaction products which have been treated with a basic reagent. When the neutralization is performed with a polyvalent basic metal compound such as lime, a product having excess basicity may be obtained.

Both the phosphorus sulfide-olefin polymer reaction product, and the neutralized reaction product, particularly if the latter is incompletely neutralized, possess a characteristic odor which they impart to the lubricant to which they are added. While this does not in any way impair the effectiveness of the compounds in inhibiting the formation of sludge and varnish, it may be objectionable from a sales viewpoint. These products can be substantially freed of this odor by reacting the same with a compound having an active hydrogen atom at an elevated temperature, for example, from about 100° F. to 600° F. and preferably from about 300° F. to 400° F., until a substantial portion of the sulfur is removed as hydrogen sulfide, and the product is substantially odorless. While we may employ compounds such as alcohols, ammonia, and/or amines, we prefer to employ steam. Thus, the aforesaid reaction products can be readily freed of the odor by blowing steam through the reaction products, either in an undiluted state or in solution in oil or other suitable solvent, while maintaining the mixture at the aforesaid temperatures.

Treating the phosphorus sulfide-olefin polymer reaction products with a compound having an active hydrogen atom, such as steam, at an elevated temperature, results in the final product containing substantially smaller amounts of sulfur. This, however, has substantially no effect on the sludge and varnish inhibiting properties of the product.

The following examples are intended to be illustrative of methods of preparing the hereindescribed improved additives and are not intended to limit the scope of the invention.

EXAMPLE I

PREPARATION OF POLYMER

The olefin polymer employed as the starting material in this and the following examples was an isobutylene polymer having a Saybolt Universal viscosity at 210° F. of about 3000 seconds and was obtained by polymerizing a hydrocarbon mixture containing from about 10% to about 25% isobutylene at a temperature of about 32° F. in the presence of boron fluoride. After the polymerization of isobutylene together with a relatively minor amount of normal olefins present, the reaction mass was neutralized and washed free of acidic substances arising from the catalyst. The oily layer formed was separated and the polymer subsequently separated from the unreacted hydrocarbons by distillation. The polymer was then distilled to obtain a bottoms having a Saybolt Universal viscosity of about 3000 second at 210° F.

$P_2S_5$-POLYMER REACTION

The isobutylene polymer having a Saybolt Universal viscosity at 210° F. of about 3000 seconds was heated with 10% phosphorus penta-sulfide at a temperature of 380° F. for eight hours. After the reaction product so obtained had cooled to 180° F., 3% KOH was added, and the mixture was heated at 180° F. for two hours. At the end of the two hour period the temperature was raised to about 340-350° F. and maintained within this range for three hours. This product had a characteristic odor, and showed the following analysis:

| | Per cent |
|---|---|
| Phosphorus | 3.04 |
| Sulfur | 3.97 |
| Potassium | 2.1 |

DEODORIZATION

The above product was diluted with an equal volume of an SAE 20 motor oil and steam blown for three and one-half hours at temperatures of from about 340 to 350° F. At the end of this period the product was substantially free of any characteristic odor, and showed approximately the same phosphorus and potassium analysis but showed substantially no sulfur.

EXAMPLE II

The olefin polymer used in Example I was treated with 10% phosphorus pentasulfide at a temperature of 380° F. for eight hours. The phosphorus pentasulfide-olefin polymer reaction product was then diluted with an equal volume of an SAE 20 motor oil and treated with 3% of potassium hydroxide at a temperature of 180° F. for two hours. At the end of the two hour heating period the temperature was raised to 340-380° F. and the product was steam blown within this temperature range for three hours. The final product was substantially free of sulfur and the characteristic odor and contained substantially the same amount of phosphorus and potassium as the product in Example I.

EXAMPLE III

The olefin polymer used in this example was identical with the polymer used in Example I and the P₂S₅-olefin polymer was obtained in the manner described in Example I. The P₂S₅-olefin polymer was diluted with an equal volume of an SAE 20 motor oil and treated with 6% KOH at a temperature of 180° F. for two hours. The temperature was then raised to about 340-350° F. and maintained within this range for three additional hours, and the product was blown with steam at this temperature for three more hours. A product substantially free of the characteristic odor was obtained.

The effectiveness of the deodorized phosphorus sulfide-olefin polymer reaction products in improving the stability of lubricating oils may be demonstrated by a test described as follows: Two hundred and fifty cc. of the oil to be tested is heated at 330° F. to 332° F. in a 500 cc. glass beaker in the presence of five square inches of copper and ten square inches of iron. Four glass rods of six millimeter diameter are suspended in the oil which is stirred at about 1300 R. P. M. with a glass stirrer having a 40° blade pitch. At stated intervals oil samples are taken and the sludge, acidity, and viscosity values determined. The glass rods are also inspected for evidence of varnish formation thereon. Varnish values are based on a visual rating in which glass rods free of any varnish are given a rating of 10, heavily coated rods are given a rating of 1, and rods having coatings between these extremes are given intermediate values between 1 and 10.

The following oils were subjected to the above test:

Oil A—Control (high grade SAE 20 motor oil).
Oil B—Oil A+1% of the deodorized product of Example I.
Oil C—Oil A+1% of the deodorized product of Example II.

TABLE I

| Oil | Vis.[1] Increase | Sludge mg./10 g. oil | | | Acidity mg. KOH/g. oil | | | Varnish [2] | | |
|---|---|---|---|---|---|---|---|---|---|---|
| | 48 hrs. | 24 hrs. | 48 hrs. | 72 hrs. | 24 hrs. | 48 hrs. | 72 hrs. | 24 hrs. | 48 hrs. | 72 hrs. |
| Oil A | 607 | 30 | 762 | ---- | 3.7 | 9.0 | ---- | 8 | 2-3 | ---- |
| Oil B | 71 | 0 | 0 | 77 | 1.4 | 2.5 | 3.4 | 10 | 10 | 10 |
| Oil C | 131 | 0 | 0 | 72 | 1.7 | 1.8 | 3.4 | 10 | 10 | 10 |

[1] Saybolt Universal viscosity at 100° F.
[2] 10=no deposit; 1=very heavy deposit.

The above data show the marked improvement obtained by the addition of small amounts of the deodorized phosphorus sulfide-olefin polymer reaction product to a high grade SAE 20 motor oil.

The effectiveness of the deodorized phosphorus sulfide-olefin polymer reaction products in inhibiting the formation of sludge, carbon and/or varnish in internal combustion engines is demonstrated by the following data obtained in an engine test conducted in a standard six cylinder spark-ignition engine operating for sixty hours at 35 B. H. P., 3000 R. P. M. and an oil sump temperature of about 285° F. At the end of each test period the engine was dismantled and given a visual engine rating in which a rating of 10 means that the engine parts had substantially the same appearance at the end of the test as at the start of the test, while an engine rating of 1 means that the engine parts are very badly coated. An engine rating of intermediate value between 1 and 10 means that the appearance of the engine parts after the test is between these extremes. In Table II the visual ratings are given on the following oils.

Oil A—Control (high grade SAE 20 motor oil).
Oil B—Oil A+¼% deodorized reaction product of Example III.
Oil C—Oil A+¾% deodorized reaction product of Example III.
Oil D—Oil A+1.0% deodorized reaction product of Example II.

TABLE II

ACCELERATED ENGINE TEST

*Visual engine ratings at end of 60 hours*

| Oil samples | A | B | C | D |
|---|---|---|---|---|
| Piston varnish | 5 | 6 | 10 | 10 |
| Sludge deposits | 6 | 8 | 9 | 10 |
| Ring belt carbon | 5 | 9 | 10 | 10 |
| Under Crown carbon | 5 | 6 | 10 | 10 |
| Overall rating | 5.3 | 7.2 | 9.8 | 10 |

The above data demonstrate the marked improvement in engine cleanliness obtained with motor oils containing small amounts of the deodorized phosphorus sulfide-olefin polymer reaction products.

The deodorized reaction products are also effective in inhibiting corrosion of metals, particularly of hard metal alloys such alloys of the cadmium-silver type used in bearings.

While we may use the deodorized phosphorus sulfide-olefin polymer reaction products in lubricating oils, which may be used in such oils in amounts of from about 0.001% to 10.0% and preferably from about 0.01% to about 3.0%, our invention is not limited to such use, since these products may be used in other petroleum products, such as insulating oils, white oils, greases, waxes, etc. to inhibit the oxidation, sludging and deterioration thereof.

Although we have described preferred embodiments of our invention, other modifications may be made without departing from the scope and spirit of the invention, and we do not wish to limit our invention to the specific examples set forth herein, except insofar as the same is defined by the following claims.

We claim:

1. A lubricant composition comprising a mineral oil and a small amount of the product obtained by the method comprising reacting a phosphorus sulfide and an olefin polymer whereby a phosphorus and sulfur-containing reaction product is obtained, neutralizing with a basic reagent, and treating at a temperature above about 100° F. with an agent having an active hydrogen atom to obtain a product having a substantially lower sulfur content than the initial reaction product.

2. A lubricant composition comprising a mineral oil and a small amount of a neutralized, phosphorus-containing product obtained by the method comprising the steps, reacting a phosphorus sulfide with an olefin polymer whereby a phosphorus and sulfur-containing reaction product is obtained, neutralizing with a basic reagent, and treating the product at a temperature above about 100° F. with an agent having an active hydrogen atom to obtain a substantially sulfur-free product.

3. A lubricant composition comprising a mineral oil and a small amount of a neutralized, phosphorus-containing product obtained by the method comprising the steps, reacting a phosphorus sulfide with an olefin polymer whereby a phosphorus and sulfur-containing reaction product is obtained, neutralizing with a basic reagent, and treating the product at a temperature above about 200° F. with steam to obtain a substantially sulfur-free product.

4. A lubricant composition comprising a mineral oil and a small amount of a metal-containing neutralized phosphorus-containing product obtained by reacting a phosphorus sulfide with an olefin polymer whereby a phosphorus and sulfur-containing product is obtained, neutralizing the reaction product with a basic reagent having a metal constituent, and treating the neutralized product at a temperature above about 100° F. with an agent having an active hydrogen atom to obtain a substantially sulfur-free product.

5. A lubricant composition comprising a mineral oil and a small amount of a metal-containing neutralized phosphorus-containing product obtained by reacting a phosphorus sulfide with an olefin polymer whereby a phosphorus and sulfur-containing product is obtained, neutralizing the reaction product with a basic reagent having a metal constituent, and blowing the neutralized product at a temperature above about 200° F. with steam to obtain a substantially sulfur-free product.

6. A lubricant composition as described in claim 5 in which the metal is an alkali metal.

7. A lubricant composition as described in claim 5 in which the metal is potassium.

8. A lubricant composition as described in claim 5 in which the metal is sodium.

9. A lubricant composition as described in claim 5 in which the metal is an alkaline earth metal.

10. A lubricant composition as described in claim 5 in which the metal is calcium.

11. A new composition comprising a hydrocarbon oil and the product obtained by the method comprising reacting a phosphorus sulfide and an olefin polymer whereby a phosphorus and sulfur-containing reaction product is obtained, neutralizing with a basic reagent, and treating at a temperature above about 100° F. with an agent having an active hydrogen atom to obtain a product having a substantially lower sulfur content than the initial reaction product.

12. A new composition comprising a hydrocarbon oil and a neutralized phosphorus-containing product obtained by the method comprising the steps, reacting a phosphorus sulfide with an olefin polymer whereby a phosphorus and sulfur-containing reaction product is obtained, neutralizing with a basic reagent, and treating the product at a temperature above about 100° F. with an agent having an active hydrogen atom to obtain a substantially sulfur-free product.

13. A new composition comprising a hydrocarbon oil and a metal-containing neutralized, phosphorus-containing product obtained by reacting a phosphorus sulfide with an olefin polymer whereby a phosphorus and a sulfur-containing product is obtained, neutralizing the reaction product with a basic reagent having a metal constituent, and treating the neutralized product at a temperature above about 100° F. with an agent having an active hydrogen atom to obtain a substantially sulfur-free product.

14. A new composition as described in claim 13 in which the metal is an alkali metal.

15. A new composition as described in claim 13 in which the metal is potassium.

16. A new composition as described in claim 13 in which the metal is sodium.

17. A new composition as described in claim 13 in which the metal is an alkaline earth metal.

18. A new composition as described in claim 13 in which the metal is calcium.

19. A new composition comprising a hydrocarbon oil and a metal-containing neutralized, phosphorus-containing product obtained by reacting a phosphorus sulfide with an olefin polymer whereby a phosphorus and sulfur-containing product is obtained, neutralizing the reaction product with a basic reagent having a metal constituent, and blowing the neutralized product at a temperature above about 200° F. with steam to obtain a substantially sulfur-free product.

CLARENCE M. LOANE.
JAMES W. GAYNOR.
LAWSON W. MIXON.